(12) United States Patent
Ambrosius et al.

(10) Patent No.: US 11,131,805 B2
(45) Date of Patent: Sep. 28, 2021

(54) OPTICAL COMPONENT AND METHOD FOR THE PRODUCTION THEREOF

(71) Applicant: LPKF Laser & Electronics AG, Garbsen (DE)

(72) Inventors: Norbert Ambrosius, Garbsen (DE); Roman Ostholt, Langenhagen (DE); Daniel Dunker, Hannover (DE); Malte Schulz-Ruhtenberg, Wunstorf (DE); Arne Schnoor, Hannover (DE); Tobias Jaus, Nuremberg (DE)

(73) Assignee: LPKF LASER & ELECTRONICS AG, Garbsen (DE)

( * ) Notice: Subject to any disclaimer, the term of this patent is extended or adjusted under 35 U.S.C. 154(b) by 0 days.

(21) Appl. No.: 16/649,216

(22) PCT Filed: Aug. 29, 2018

(86) PCT No.: PCT/EP2018/073229
§ 371 (c)(1),
(2) Date: Mar. 20, 2020

(87) PCT Pub. No.: WO2019/068396
PCT Pub. Date: Apr. 11, 2019

(65) Prior Publication Data
US 2020/0301068 A1    Sep. 24, 2020

(30) Foreign Application Priority Data
Oct. 4, 2017   (DE) .................... 10 2017 122 992.2

(51) Int. Cl.
*G02B 6/122*   (2006.01)
*G02B 6/12*    (2006.01)
*F21V 8/00*    (2006.01)

(52) U.S. Cl.
CPC .......... *G02B 6/122* (2013.01); *G02B 6/0043* (2013.01); *G02B 2006/12097* (2013.01)

(58) Field of Classification Search
CPC ..................... G02B 2006/12176; G02B 6/136
See application file for complete search history.

(56) References Cited

U.S. PATENT DOCUMENTS

| | | | |
|---|---|---|---|
| 4,849,986 A * | 7/1989 | Boerner ............. | G02B 6/12002 372/97 |
| 5,601,731 A | 2/1997 | Hillmer | |
| 5,866,200 A | 2/1999 | Takashi et al. | |
| 6,528,755 B2 | 3/2003 | Grewell et al. | |

(Continued)

FOREIGN PATENT DOCUMENTS

| | | |
|---|---|---|
| CN | 1443103 A | 9/2003 |
| DE | 3525661 A1 | 1/1987 |

(Continued)

*Primary Examiner* — Omar R Rojas
(74) *Attorney, Agent, or Firm* — Leydig, Voit & Mayer Ltd.

(57) ABSTRACT

An optical component, in particular a passive component, for optical waveguiding, includes: optical waveguides formed in a carrier substrate as a waveguide pattern. The optical waveguides are formed in the carrier substrate by recesses by cutting out the optical waveguide. In an embodiment, the optical waveguide is connected to the carrier substrate by web-shaped supporting structures.

22 Claims, 6 Drawing Sheets

(56) References Cited

U.S. PATENT DOCUMENTS

| | | | |
|---|---|---|---|
| 9,002,163 B2 * | 4/2015 | Fang | G02B 6/1228 385/50 |
| 2002/0008089 A1 | 1/2002 | Grewell | |
| 2004/0062506 A1 | 4/2004 | Komura et al. | |
| 2004/0109645 A1 | 6/2004 | Mayer | |
| 2007/0031083 A1 | 2/2007 | Logvin et al. | |
| 2010/0073954 A1 * | 3/2010 | Gebauer | G02B 6/0038 362/551 |
| 2012/0330195 A1 * | 12/2012 | Sawada | A61B 17/320092 601/2 |
| 2016/0059359 A1 | 3/2016 | Krueger et al. | |

FOREIGN PATENT DOCUMENTS

| | | |
|---|---|---|
| DE | 60206642 T2 | 6/2006 |
| DE | 102010004442 B4 | 8/2015 |
| TW | 286616 B | 9/2007 |

* cited by examiner

OPTICAL COMPONENT AND METHOD FOR THE PRODUCTION THEREOF

CROSS-REFERENCE TO PRIOR APPLICATIONS

This application is a U.S. National Phase application under 35 U.S.C. § 371 of International Application No. PCT/EP2018/073229, filed on Aug. 29, 2018, and claims benefit to German Patent Application No. DE 10 2017 122 992.2, filed on Oct. 4, 2017. The International Application was published in German on Apr. 11, 2019 as WO/2019/068396 under PCT Article 21(2).

FIELD

The invention relates to an optical component, in particular a passive component, for optical waveguiding, comprising an optical waveguide formed in a carrier substrate as a waveguide pattern. In particular, the invention relates to optical components which are designed as planar optical waveguides, so-called PLCs (planar lightwave circuits). The invention also relates to a method for producing such an optical component.

BACKGROUND

Such optical components have a planar design determined by the carrier substrate. The carrier substrate is usually glass, into which a number of optical waveguides, which form a desired waveguide pattern, are integrated by suitable processing.

According to the prior art, the structuring of the optical waveguide pattern preferably takes place lithographically. In this lithographic structuring, a photoresist is applied to the carrier substrate and a mask representing the optical waveguide pattern is produced. A suitable substance providing the ions for the diffusion process, in particular a suitable salt solution, is subsequently applied. In order to form the optical waveguides, sodium ions or silver ions are, for example, diffused into the carrier substrate. The ion diffusion process is assisted by applying an electric field.

The optical waveguides or the carrier substrate can consist of different materials. For example, the waveguide material may be polyimide, silicon, a semiconductor, LiNbO 3 or the like. The substrate material may be a silica-based material or silicon dioxide-based material or the like. Various methods, for example spin-coating, sol-gel processing, sputtering, atomization, chemical vapor deposition (CVD), ion diffusion, direct ion beam deposition or the like, can be used in the production.

For example, DE 10 2010 004 442 B4 discloses an optical component for optical waveguiding with a waveguide pattern integrated into a carrier substrate. The component has a waveguide pattern which is integrated into a carrier substrate, in particular glass, and in which two planar carrier substrate halves with waveguide halves formed therein and having a semicircular cross-sectional shape are provided. The two carrier substrate halves are connected to one another in such a way that the respective waveguide halves complement one another to form an optical waveguide. The waveguide halves are formed in a manner known per se by ion diffusion, in particular field-assisted ion diffusion. The optical waveguides are preferably designed as multimode waveguides.

DE 602 06 642 T2 relates to a planar lightwave circuit (PLC) comprising an optical device. The waveguide structure serves as a stable substrate for the thin layer or a stack of thin-film layers and simultaneously as an optical waveguide.

U.S. Pat. No. 6,528,755 B2 already discloses a light guide which is preferably formed from a flexible material and has an exit surface with a contour that is adapted to the weld contour. The light guide may preferably have scattering properties that provide a uniform beam over the entire surface area of the exit surface.

DE 35 25 661 C2 also relates to a method for easily carrying out a field-assisted ion exchange in a substrate material, for example of inorganic glass or of inorganic crystalline solids.

SUMMARY

In an embodiment, the present invention provides an optical component, in particular a passive component, for optical waveguiding, comprising: optical waveguides formed in a carrier substrate as a waveguide pattern, wherein the optical waveguides are formed in the carrier substrate by recesses by cutting out the optical waveguide.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides a substantially improved optical component.

According to an embodiment of the present invention, the optical waveguide is therefore formed by recesses in the carrier substrate, in particular by cutting out the optical waveguide in the carrier substrate, wherein the optical waveguide is connected to the carrier substrate in the region of webs. The essential idea according to the invention is to produce the structuring of the optical waveguide pattern by a laser method, namely by cutting out the optical waveguide, in a glass substrate in which method the contour is produced in the carrier substrate by introducing recesses.

The contour is preferably cut out by means of recesses which are substantially parallel cutting lines so that they define the optical waveguide between them. For this purpose, the optical waveguide pattern remains connected to the carrier substrate only by webs.

Preferably, a method known per se for ion exchange can subsequently be carried out on the outside of the optical waveguide pattern in order to achieve the desired change in the refractive index of the glass.

Furthermore, thermal post-processing can be carried out, in particular by means of laser radiation, in order to thus, for example, round the surface by means of thermal treatment or selectively introduce optically active structures, for example scattering structures for light outcoupling. Such a surface change can be provided on one side for focusing the laser power or on both sides for more efficient light guiding.

In this respect, the simple production of an optical waveguide, even with optically active structures (lenses, outcoupling, gratings, etc.) can be realized. Such structures can be, for example, conical or grating structures whose grating constant is correspondingly adjustable.

After cutting out the optical waveguides in the carrier substrate, for example a glass plate, the optical waveguides cut out are remelted in order to produce a rounded cross-section.

The invention furthermore relates to an active structure for realizing a beam deflection system as a monolithic scanner. For this purpose, an end region of the optical waveguide pattern is cut out such that vibration bearings, for example springs, can be introduced. The end piece integrally connected to the optical waveguide can thereby be excited to vibrate.

The invention preferably consists of the combination of the optical waveguides with micromechanics and resonant excitation, wherein the monolithic scanner created in this way can be produced with comparatively little effort.

The invention also relates to a structure for the extended linear and homogeneous outcoupling of laser radiation along the entire structure. For this purpose, outcoupling structures are preferably provided on the underside and/or the top side, which can be realized, for example, by conical structures. The recesses and the outcoupling structures are preferably introduced in a common working step. Such conical outcoupling structures can be produced by means of laser radiation. Opposite the outcoupling structure, the surface is preferably rounded.

According to the invention, this makes it possible to implement a method for simultaneous laser irradiation in contours, in particular for the laser welding of plastics. For this purpose, the optical waveguides are cut out in the carrier substrate, in particular a glass plate. The outcoupling of the laser radiation can take place with the aid of, for example, cones on the underside of the optical waveguides, whereby simultaneous welding is made possible.

A glass plate with structures for guiding and distributing laser radiation with at least two cuts guided substantially in parallel to one another for defining a contour to be irradiated with laser radiation is preferably used for laser material processing, in particular for laser welding. Along the contour is thus produced an outcoupling structure that is designed in such a way that laser radiation is outcoupled substantially homogeneously along the contour.

With the method according to the invention for laser material processing, in particular for laser welding, using the aforementioned device, the irradiated laser light is guided along the contour as a result of the substantially parallel cuts forming the optical waveguide and is outcoupled vertically to the plane of the carrier structure, for example the glass plate, by the outcoupling structures, and a workpiece to be machined is irradiated.

In the laser welding of plastics, two joining partners are joined together by melting and pressing along a weld contour. According to the invention, the optical waveguide of the aforementioned device can be produced according to the weld contour and can be provided with outcoupling structures on one side. The device is brought into contact or in the vicinity of a joining partner in order to melt it by means of laser radiation along the weld contour. After removal of the device, the second joining partner is pressed onto the first one in order to produce the welded joint.

In a particularly practical embodiment of the invention, the optical component can be used as a laser-active medium of a waveguide laser. In this case, the structure for waveguiding is produced around the active medium in order to be able to better guide the pumped light.

The recesses can be introduced by means of laser machining methods known per se. The laser beam is preferably briefly directed onto the glass workpiece such that only a chain of modifications takes place in the material of the carrier substrate, preferably along a beam axis of the laser beam, without the carrier substrate being destroyed, and with which, in the next step, an anisotropic material removal is carried out only in those regions of the carrier substrate which previously received a discontinuity by means of the laser beam, and the recess is thus introduced into the carrier substrate.

As a result of successive etching, the recess is formed by a plurality of strung-together discontinuities in that the previously produced discontinuities, which are expanded by the etching action to form a cavity in the carrier substrate, are connected by the etching process. As a result, the etching liquid passes quickly from discontinuity to discontinuity. The influence of gravity is not critical in this case. Rather, the etching progresses is successful in a comparable manner from top to bottom and vice versa so that the etching process can in particular start at both outsides simultaneously.

As a result of the discontinuities, which are produced as modifications within the carrier substrate, the etching process follows the line on which the discontinuities are arranged. The line may be straight or follow almost any contour that is precisely maintained by the etching process. Thus, it is also possible for the first time to produce an almost arbitrary recess contour.

Figure 1:
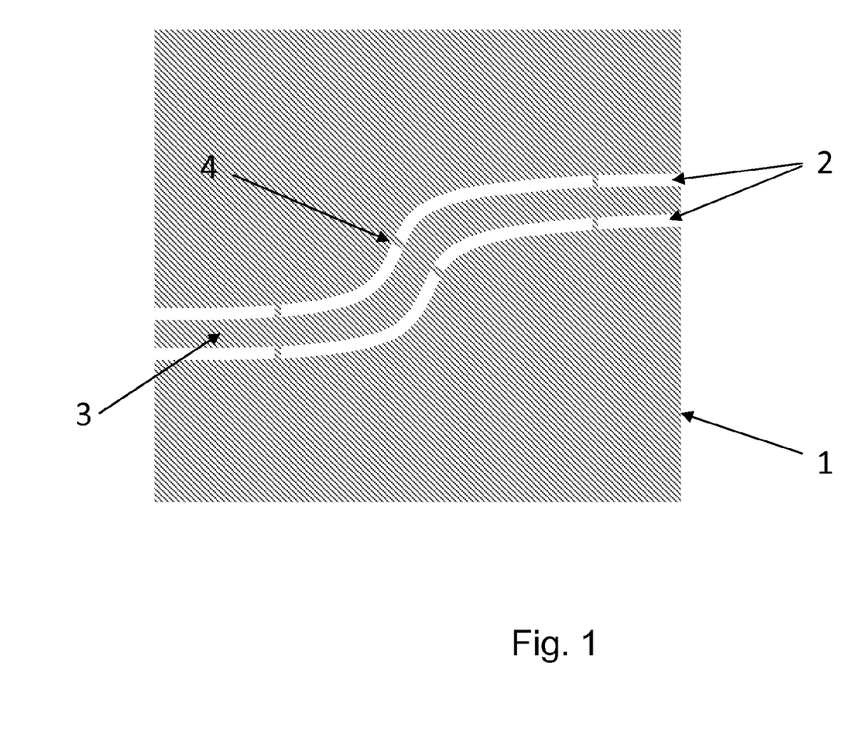
FIG. 1 a carrier substrate having two parallel optical waveguides produced by cutting out.

In a preferred exemplary embodiment, the desired contour of the optical waveguides 3 is cut out by introducing recesses 2 into a carrier substrate 1. For this purpose, two substantially parallel cutting lines between which the optical waveguide 3 is produced in this way are introduced by means of laser radiation. Connecting regions are retained as supporting structure 4. The recesses 2 are introduced by means of the laser-induced deep etching method (LIDE). After cutting out, an ion exchange for changing the refractive index of the carrier substrate 1 takes place.

Figure 2:
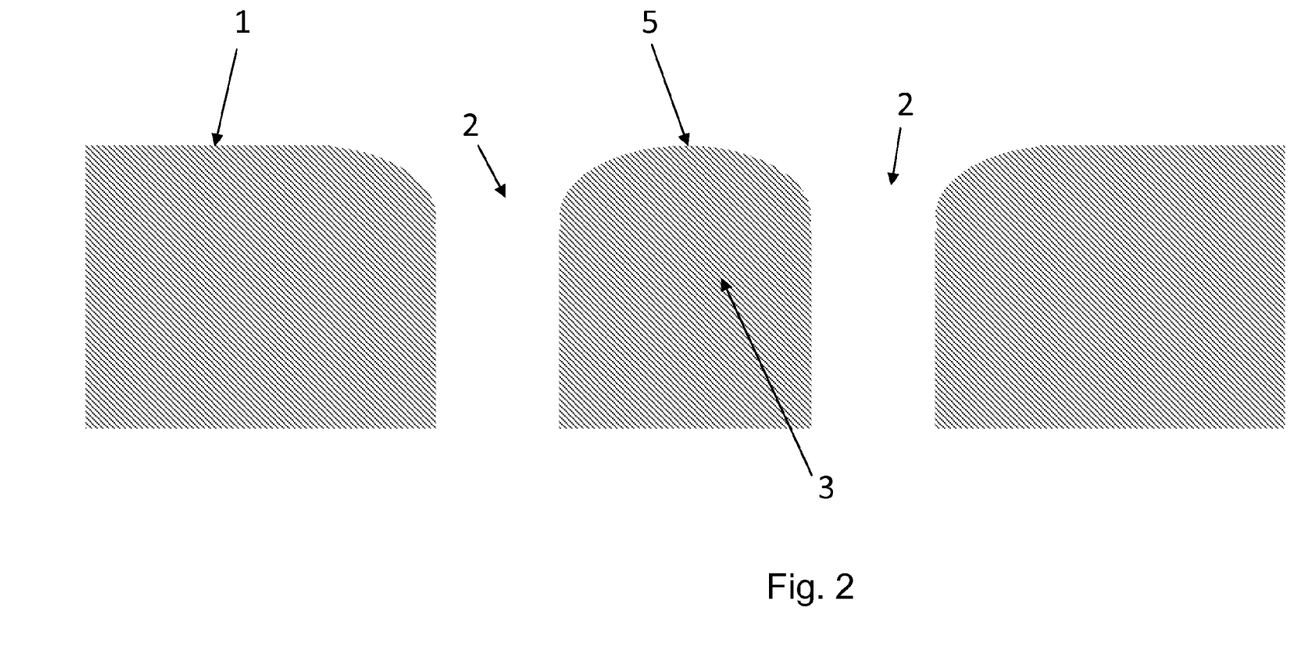
FIG. 2 a cross-section through the carrier substrate with a rounded surface structure.
Figure 4:
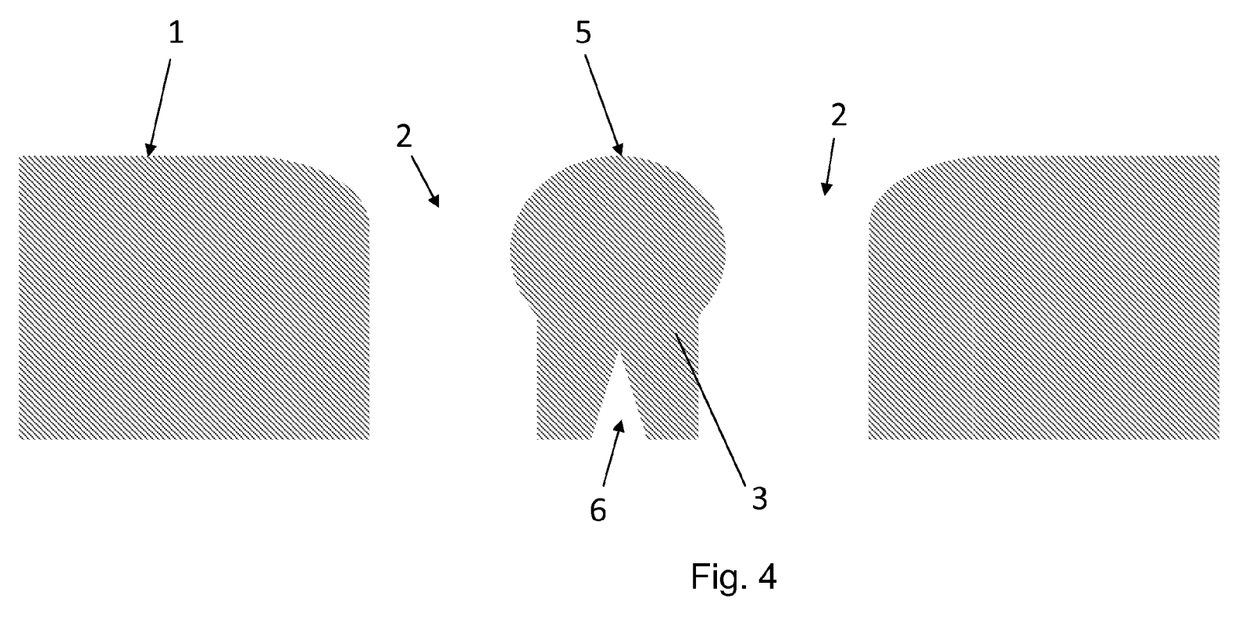
FIG. 4 a cross-section through the carrier substrate after a further rounding of the optical waveguide.

The edges of the optical waveguide 3 are subsequently treated superficially by means of thermal treatment, in particular by a selective thermal treatment by means of laser radiation, for example CO2 laser radiation, in order to produce a rounded surface structure 5.

Figure 3:
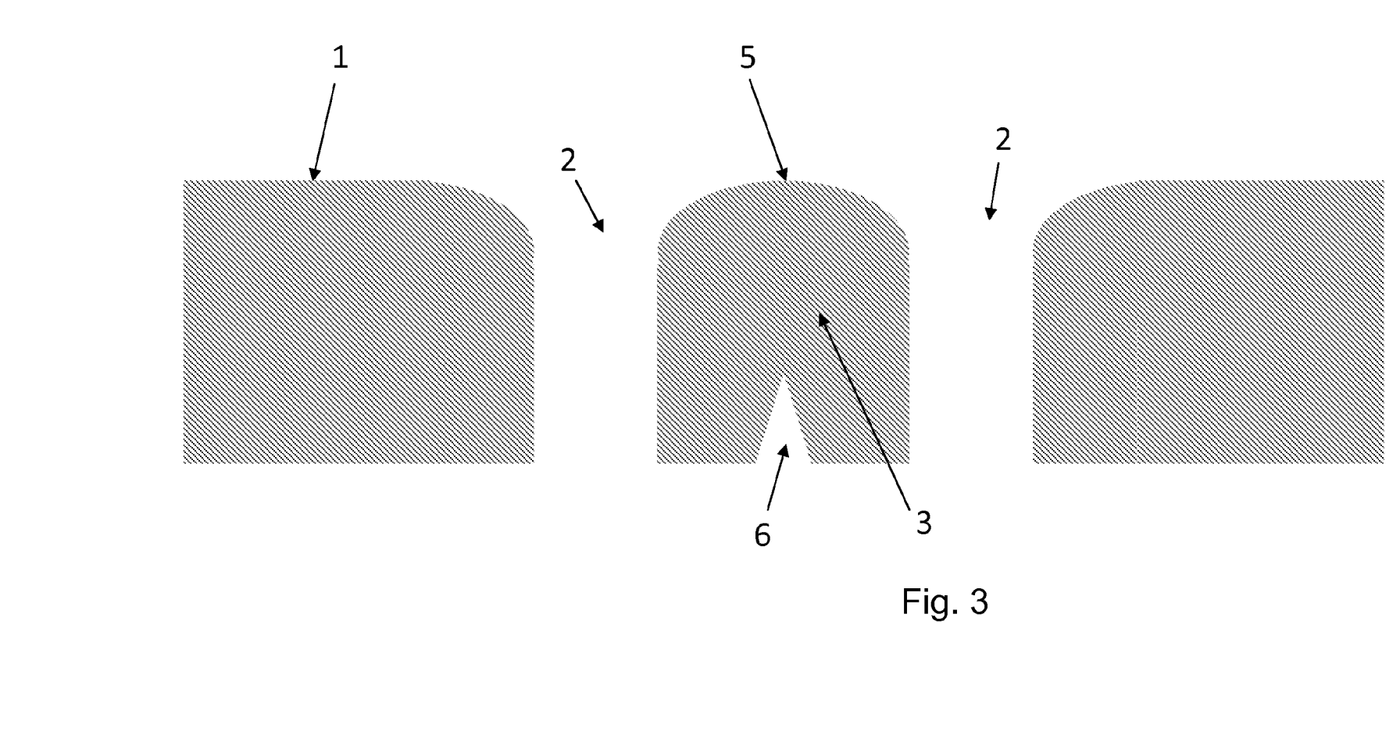
FIG. 3 a cross-section of the carrier substrate shown in FIG. 2 after the introduction of a scattering structure for light outcoupling.
Figure 5:
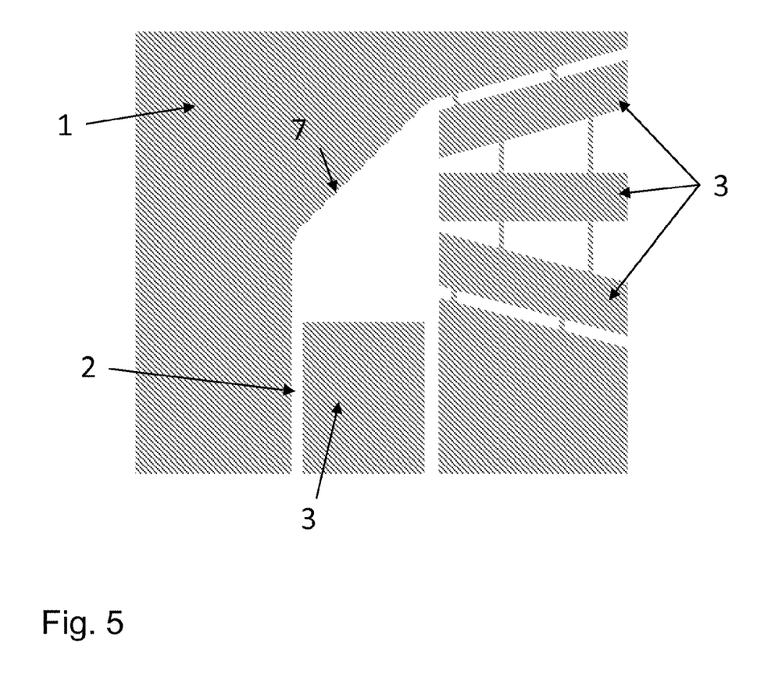
FIG. 5 the carrier substrate shown in FIG. 1 after the introduction of light-diffractive grating structures.

Scattering structures 6 for light outcoupling, which have a conical basic shape and are arranged on the rear side, are also introduced. Light-diffractive grating structures 7 are also provided on the surface of the cutting edge, the grating constant of which can be adjusted by the distance between the laser modifications.

A thin glass with a material thickness of up to 0.8 mm, preferably less than 0.3 mm or less than 0.1 mm, serves as carrier substrate 1. The optical waveguides 3 have a lateral extent of up to 0.1 mm, preferably less than 0.05 or less than 0.02 mm.

Figure 6:
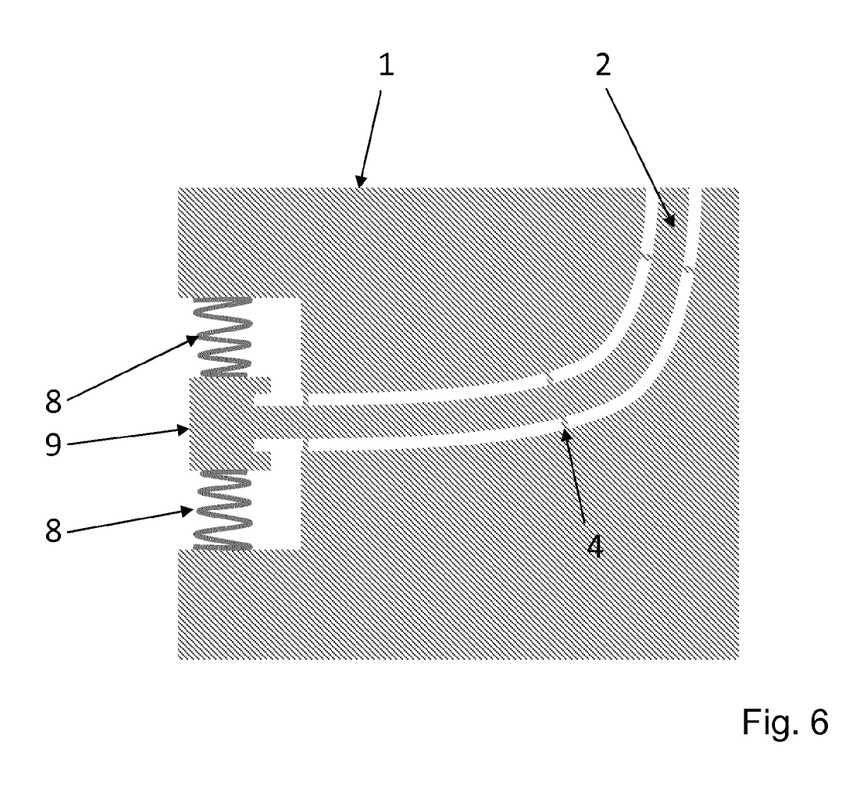
FIG. 6 a carrier substrate with an active structure for realizing a beam deflection system.

Furthermore, FIG. 6 shows an optical component which is designed as an active structure for realizing a beam deflection system of a monolithic scanner and which can be used as a micromechanical, electromagnetic or acoustic device for exciting vibrations of the end region. For this purpose, an end region 9 of the optical waveguide pattern is cut out in such a way that vibration bearings, for example spring structures 8, can be introduced. In this way, the end region 9 integrally connected to the optical waveguide 3 can be excited to resonant vibration.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS

1 Carrier substrate
2 Recess
3 Optical waveguide
4 Supporting structure
5 Surface structure
6 Scattering structure
7 Grating structure
8 Spring structure
9 End region

The invention claimed is:

1. An optical component for optical waveguiding, comprising:
 an optical waveguide formed in a carrier substrate as a waveguide pattern,
 wherein the optical waveguide is formed in the carrier substrate by recesses by cutting out the optical waveguide, and
 wherein an end region of the optical waveguide is connected to the carrier substrate by spring structures.

2. The optical component according to claim 1, wherein the optical waveguide is connected to the carrier substrate by web-shaped supporting structures.

3. The optical component according to claim 2, wherein the supporting structures have a length that is less than a width of the optical waveguide in a direction of a main extent of the optical waveguide.

4. The optical component according to claim 1, wherein at least two supporting structures are provided opposite each other on the optical waveguide in each case.

5. The optical component according to claim 1, wherein the optical waveguide is equipped, at least in sections, with an optically active structure comprising a scattering structure configured for light outcoupling.

6. The optical component according to claim 5, wherein the optically active structure has a conical and/or grating structure.

7. The optical component according to claim 1, wherein the optical waveguide has an outcoupling structure on its underside and/or its top side.

8. The optical component according to claim 7, wherein the structure is configured for extended linear and homogeneous outcoupling of laser radiation along the entire structure.

9. The optical component according to claim 1, wherein the carrier substrate is completely penetrated by the recesses between an outer contour of the optical waveguide and an opposite surface of the carrier substrate.

10. The optical component according to claim 1, further comprising a device comprising a micromechanical, electromagnetic, or acoustic device configured to excite vibrations of the end region.

11. The optical component according to claim 10, wherein the device is configured to excite resonant vibrations of the end region.

12. The optical component according to claim 1, wherein the optical waveguide has a shape adapted to a weld contour.

13. A waveguide laser, comprising:
 a laser-active medium;
 a pump source for the laser-active medium;
 a resonator having an optical waveguide extending in an axial direction; and
 the optical component with the optical waveguide for the laser-active medium according to claim 1.

14. A method for producing an optical component for optical waveguiding, comprising:
 structuring an optical waveguide in a carrier substrate according to a waveguide pattern,
 wherein the structuring of the optical waveguide pattern is carried out by a laser method by introducing recesses into the carrier substrate by cutting out the optical waveguide in a glass substrate so as to produce a contour of the respective optical waveguide, and
 wherein an end region of the optical waveguide is connected to the carrier substrate by spring structures.

15. The method according to claim 14, wherein a post-processing of the optical waveguide is carried out by laser radiation, and optically active structures are introduced.

16. The method according to claim 14, further comprising, after introducing the recesses into the carrier substrate, carrying out an ion exchange method for changing a refractive index of the carrier substrate or of the optical waveguide.

17. The method according to claim 14, wherein in order to carry out a laser welding method of plastics, a first joining partner is first heated along a joining contour by the optical waveguide and, after removal of the optical waveguide, at least one further joining partner is subsequently connected to the still heated first joining partner.

18. The method according to claim 14, wherein the recesses are introduced into the carrier substrate by laser radiation such that a laser beam is briefly directed onto the glass workpiece so that only a chain of modifications takes place in a material of the carrier substrate without the carrier substrate being destroyed, and, with which, in a next step, an anisotropic material removal is carried out only in those regions of the carrier substrate which previously received a discontinuity by the laser beam so as to introduce the recess into the carrier substrate.

19. The method according to claim 18, wherein the chain of modifications takes place in a material of the carrier substrate along a beam axis of the laser beam.

20. The optical component according to claim 1, wherein the recesses are formed laser-induced deep etching.

21. The optical component according to claim 1, wherein edges of the optical waveguide are treated by a selective thermal treatment by laser radiation to produce a rounded surface structure.

22. The optical component according to claim 1, wherein the recesses are formed along a curved contour.

* * * * *